United States Patent [19]

Osumi

[11] 3,977,276

[45] Aug. 31, 1976

[54] METHOD FOR PRODUCING A FORMING TOOL HAVING A SINTERED WEB-LIKE CUTTING EDGE

[75] Inventor: Nobuyuki Osumi, Hamamatsu, Japan

[73] Assignee: Orion Tool Co., Ltd., Japan

[22] Filed: May 7, 1975

[21] Appl. No.: 575,209

[30] Foreign Application Priority Data

Aug. 27, 1974 Japan.............................. 49-98231

[52] U.S. Cl............................................... 76/104 R
[51] Int. Cl.².......................................... B21K 11/00
[58] Field of Search.......... 76/101 R, 101 A, 101 D, 76/104 R, DIG. 10, DIG. 11; 228/122, 124, 161, 162

[56] References Cited
UNITED STATES PATENTS

| | | | |
|---|---|---|---|
| 1,770,157 | 7/1930 | Humphries........................ | 76/104 R |
| 2,041,345 | 5/1936 | Jaques............................... | 76/104 R |
| 2,354,144 | 7/1944 | Ross................................... | 76/101 A |
| 2,758,363 | 8/1956 | Praeg............................. | 76/101 A X |
| 3,372,464 | 3/1968 | Vincent.............................. | 228/124 |
| 3,677,060 | 7/1972 | Loquist........................... | 228/122 X |

Primary Examiner—Al Lawrence Smith
Assistant Examiner—Nicholas P. Godici
Attorney, Agent, or Firm—McNenny, Pearne, Gordon, Gail, Dickinson & Schiller

[57] ABSTRACT

A method for producing a forming tool having a cutting edge which comprises the steps of preparing a metal mount having a cutting blade support portion of predetermined shape, fixedly mounting a superhard cutting blade blank having an area substantially greater than that of said support portion, cutting said cutting blade blank along the contour of said support portion and edging said cutting blade blank along a predetermined edge portion thereof.

2 Claims, 8 Drawing Figures

METHOD FOR PRODUCING A FORMING TOOL HAVING A SINTERED WEB-LIKE CUTTING EDGE

BACKGROUND OF THE INVENTION

This invention relates to a method for producing a cutting tool and more particularly, to a method for producing a cutting tool for ceramics.

Up to date, cutting tools for ceramics have been generally formed of high speed steel. The high speed steel cutting tool can be readily produced because such a tool has a unitary solid structure and the high speed steel cutting tool also has the advantage that such a tool can be made precisely because no crack develops during the forming of the cutting tool by virtue of its toughness. However, when a ceramics product such as a high voltage insulator, for example, is produced, there is the disadvantage that the high speed steel cutlery is liable to receive damage and/or wears away rapidly because the material of the ceramics product has fragments of rock and/or clay contained therein. Therefore, the service life of the conventional high speed steel cutting tools for ceramics was limited to 4 — 5 days to the longest even when used under normal cutting operation conditions and in the worst case, to only one day. Thus, a cutting tool for ceramics having a high durability or long service life has been long desired.

SUMMARY OF THE INVENTION

This invention has been devised to satisfy this desire. That is, according to the present invention, in order to increase the hardness of the cutting edge of a cutting blade for ceramics so that the cutting edge can resist damaging and or abrasive action by fragments of rock which are often present in ceramics to be processed by the cutting blade, the cutting blade is formed of a sintered material which is harder than rock such as superhard alloy prepared by the so-called sintering process, for example, and the sintered alloy cutting blade is then edged by the conventional edging process.

Up to date, as a part of the development efforts for cutting tools having cutting blades attached thereto, many studies have been made on the use of a sintered material such as superhard alloy as the material in the production of cutlery for ceramics. However, since most of the cutlery for ceramics are forming tools, when the web-like superhard alloy cutting blade is brazed to the metal mount or support, a crack or cracks frequently develop in the web-like cutting blade due to difference between coefficients of thermal expansion of the superhard alloy cutting blade blank and metal mount which lead to failure of the production of satisfactory cutting tools for ceramics. Thus, in the industry, it has been considered difficult to produce practical cutting tools for ceramics. The reasons are that the problem of crack development can not be easily solved and that superhard alloy can not be easily processed to a complicate configuration product by the use of diamond.

Therefore, the principal object of the present invention is to provide a novel and improved method for the production of a cutting tool having a cutting blade attached thereto.

Another object of the present invention is to provide a novel and improved method for producing a cutting tool having a cutting blade attached thereto and a longer service life for use in the processing of ceramics.

Another object of the present invention is to provide a method for producing a forming tool having a cutting blade attached thereto for ceramics which can always exhibit its excellent cutting efficiency after simple re-grinding.

Another object of the present invention is to provide a method for producing a forming tool having a cutting blade attached thereto and a complicate configuration without causing any crack to develop in the cutting blade.

A further object of the present invention is to provide a method for producing a forming tool for ceramics which comprises a web-like sintered cutting blade formed of superhard alloy brazed to a metal mount or support without causing any crack to develop in the cutting blade.

According to the present invention, there has been provided a method for producing a forming tool having a sintered web-like cutting edge comprising the steps of preparing a metal mount having a sintered member support portion of predetermined shape, fixedly attaching and uniting a sintered member having an area substantially greater than that of said support portion to the support portion, shaping said sintered member along the contour of the support portion and edging said sintered member along a predetermined edge portion of the sintered member to provide a cutting edge on the sintered member.

The above and other objects and attendant advantages of the present invention will be more readily apparent to those skilled in the art from a reading of the following detailed description in conjunction with the accompanying drawings which show two preferred embodiments of the invention for illustration purpose only and are not intended to limit the scope of the same in any way.

BRIEF DESCRIPTION OF THE DRAWINGS

FIGS. 1 through 4 show a first embodiment of forming tool produced by the method of the present invention in which FIG. 1 is an isometrical perspective view of the metal mount of said forming tool;

FIG. 2 is an isometrical perspective view of a superhard alloy blank for one type of cutting blade to be fixedly attached to said metal mount of FIG. 1; and FIG. 3 is an isometrical perspective view of a superhard alloy blank for another type of cutting blade to be fixedly attached to said metal mount of FIG. 1; and FIG. 4 is an isometrical perspective view of the complete first embodiment of forming tool;

PREFERRED EMBODIMENTS OF THE INVENTION

Figure 1:
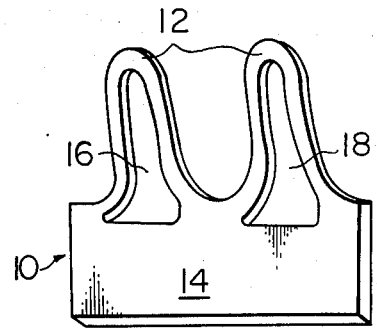
Figure 2:
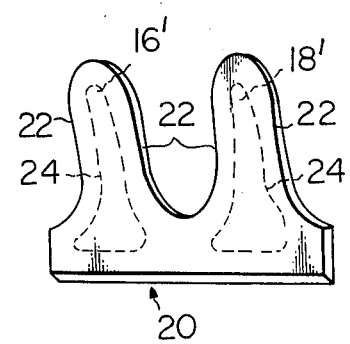

The present invention will now be described referring to the accompanying drawings and more particularly, to FIGS. 1 through 4 thereof in which the first embodiment of forming tool of the invention is shown. In FIG. 1, the metal mount of the forming tool is generally shown by reference numeral 10 and has a cutting blade support portion 12 having a configuration which substantially conforms with that of a desired superhard alloy cutting blade to be fixedly attached to the support portion and edged along the latter and an integral shank portion 14. The cutting blade support portion 12 of the mount 10 is formed with openings 16 and 18 through which chips generated during a cutting operation are allowed to discharge out of the system. In FIG. 2, the superhard alloy blank of one type of cutting blade is generally shown by reference numeral 20 and has a contour portion 22 substantially conforming with that of the support portion 12 of the mount where the cutting edge is to be formed in any conventional grinding process. The area of the superhard alloy cutting blade blank 20 is substantially greater than that of the support portion 12. The superhard cutting blade blank 20 is fixedly attached to one side of the support portion 12 of the metal mount 10 by means of brazing or the like process with the contour portion 22 aligned with the corresponding contour portion of the support portion 12. Thereafter, the superhard alloy cutting blade blank 20 is processed following the contour of the support portion 12 and at the same time, the region of the cutting blade blank 20 facing to the openings 16 and 18 in the support portion 12 is hollowed out following the peripheral walls of the openings 16, 18 to provide openings 24, 24 which correspond in shape to the openings 16, 18 with which the openings 24 cooperate to provide chip discharge passages. Finally, the contour portion 22 of the blank 20 is edged to provide the complete forming tool as shown in FIG. 4.

According to the present invention, different from the chip-type superhard alloy cutting blade which has been generally employed in the conventional forming tool or the web-type cutting blade which is easily susceptible to cracking, the superhard alloy cutting blade blank 20 of the invention has an area greater than that of the support portion 12 of the mount 10 whereby the finished superhard alloy cutting blade has a substantially increased heat capacity to thereby perfectly eliminate occurrence of crack in the cutting blade during the formation of the blade.

Figures 3, 4:
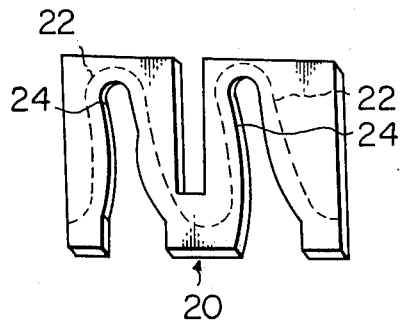
Figure 5:
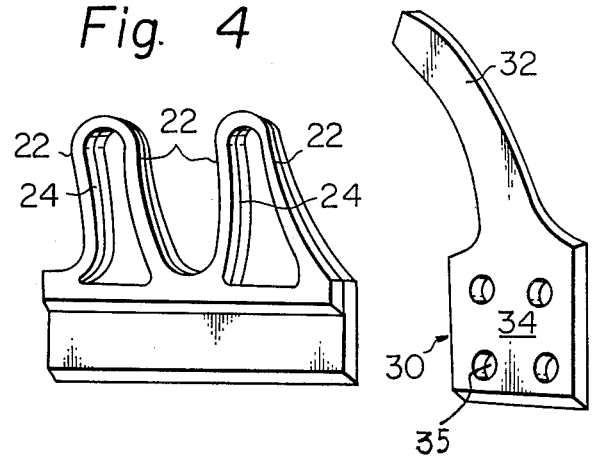
FIG. 5 is an isometrical perspective view of one metal mount of said second or complex embodiment of forming tool.
Figure 6:
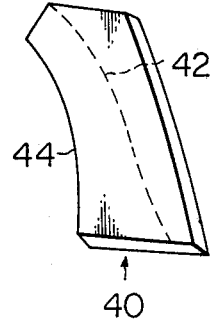
FIG. 6 is an isometrical perspective view of a superhard alloy blank for one type of cutting blade to be fixedly attached to said metal mount of FIG. 5.

Referring now to FIG. 3 in which another type of superhard alloy cutting blade blank of rectangular configuration is generally shown by reference numeral 20 and has two separate openings 24, 24 preformed therein. In the cutting blade blank 20 of FIG. 3, the openings 24 opposed to the cutting edges 22, 22 have a shape substantially corresponding to that of the openings 16 and 18 in the support portion 12 of the metal mount 10, but are open at one end thereof. The cutting blade blank 20 is fixedly attached to one side of the support portion 12 of the metal mount 10 in the same manner as described in connection with the cutting blade 20 of FIG. 2 with the openings 24, 24 aligned with the openings 16 and 18 in the support portion 12 and thereafter, the cutting blade blank 20 is cut or edged along the outer periphery of the openings 16 and 18 in the support portion 12 of the mount 10. Thus, the cutting blade blank 20 can eliminate the hollowing-out step of the openings 24 and 24, such as openings 16' and 18' in FIG. 2, after the attaching of the blank to the mount 10. According to the present invention, however, it is not absolutely necessary that either of the superhard alloy blank 20 (FIG. 2) and 20 (FIG. 3) have a configuration corresponding to that of a portion of the support portion 12 of the mount 10.

Turning now to FIGS. 5 through 8 in which the second embodiment of forming tool produced by the method of the invention is illustrated. A first metal mount is generally shown by reference numeral 30 in FIG. 5 and has a cutting blade support portion 32 and an integral shank portion 34 in which a plurality of threaded holes 35 are formed for receiving threaded bolts (not shown). A first superhard alloy cutting blade blank is generally shown by reference numeral 40 in FIG. 6 and has a length substantially the same as that of the support portion 32 of the first mount and a width greater than that of the associated support portion. One side edge 44 of the first cutting blade blank 40 is preformed in conformity with the corresponding side edge of the blade support portion 32. The first cutting blade blank 40 is fixedly attached to one side of the blade support portion 32 of the first mount 30 by means of brazing or the like process with the side edge 42 aligned with the corresponding side edge of the support portion and thereafter, the other side edge or the side edge opposite the side edge 44 of the cutting blade blank 40 is edged as shown by reference numeral 42 by the convention edging process.

Figure 7:
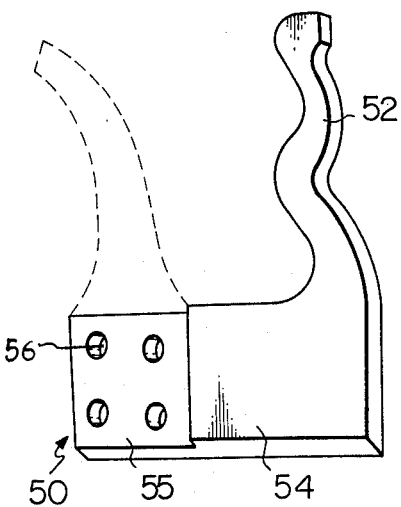
FIG. 7 is an isometrical perspective view of another metal mount of said second or complex embodiment of forming tool.
Figure 8:
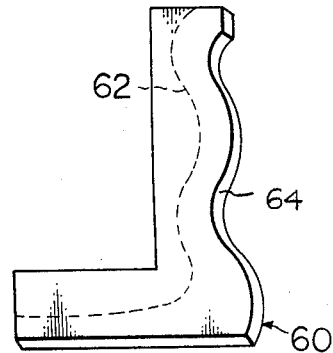
FIG. 8 is an isometrical perspective view of a superhard alloy blank of a cutting blade to be fixedly attached to the metal mount of FIG. 7.

FIG. 7 shows a second metal mount 50 which has a contoured second cutting blade support portion 52 and an integral shank portion 54. The shank portion 54 is formed in one side with a recess 55 which substantially corresponds to the shank portion 34 of the first mount 30 in size and depth for receiving the shank portion 34. The recessed portion 55 of the second mount shank portion 54 is also provided with a plurality of threaded holes 56 which align with the holes 35 in the first mount shank portion 34 when the first and second mounts 30 and 50 assembled together. Threaded bolts (not shown) are threaded in the aligned holes in the first and second mounts to secure the mounts together. A second superhard alloy cutting blade blank 60 having one side edge 64 preformed in conformity with the correspond side edge of the blade support portion 52 (as shown in FIG. 8) is fixedly attached to one side of the support portion by brazing or the like process followed by the edging at the opposite side edge of the second cutting blade blank with the side edge 54 aligned with the corresponding side edge of the support portion to thereby complete the production of the second or complex embodiment of forming tool.

Thus, according to the method of the present invention, a forming tool of high cutting efficiency and durability having a complex configuration can be easily and simply produced. Different from the prior art forming tools and especially, the prior art forming tools for ceramics products, the forming tool produced by the method of the present invention is superior in cutting ability to the prior art forming tools because the cutting blade is formed of superhard alloy. That is, the experiments conducted by the applicant have shown that the service life of the superhard alloy cutting blade of the forming tool produced by the method of the present invention is more than fifteen times as long as that of the corresponding high speed steel cutting blades of the prior art forming tools without regrinding.

When the superhard alloy cutting blade has become worn, it is only necessary to regrind the worn blade to present a sharp cutting edge again. The superhard alloy cutting blade of the forming tool produced by the method of the present invention can be reground at least eight different times before the blade will become unserviceable or its expected service life terminates. Up to date, in order to regrind the worn cutting blade, it was necessary to rebuild the blade by hard chrome plating or the like process. However, the superhard alloy cutting blade of the forming tool produced by the method of the invention can eliminate such plating process.

The fact that the superhard alloy cutting blade properties making it superior to the prior art cutting blades provides the advantages that the cutting operation efficiency employing the forming tool can be enhanced by eliminating time required for non-productive works such as replacement of the entire forming tool and adjustment thereof and that material expense can be reduced because the mount itself can be reused even after the superhard alloy cutting blade has become unserviceable after many regrinding operations. The experiments made by the applicant also have shown that the cutting operation by the use of the forming tool produced by the method of the present invention can reduce expenditure involved to about one half of that required by the use of the corresponding prior art forming tools with respect to time and personal expense in installing, detaching and adjusting and also service life.

While only two embodiments of the invention have been shown and described in detail, it will be understood that the same are for illustration purpose only and not to be taken as a definition of the invention, reference being had for the purpose to the appended claim.

What is claimed is:

1. A method for producing a forming tool having a sintered web-like cutting edge comprising the steps of preparing a metal mount having a sintered member support portion of predetermined shape, fixedly attaching with the application of heat a sintered member having an area substantially greater than that of said support portion to the support portion, said greater area of said sintered member providing an increased heat capacity during the attaching step shaping said sintered member along the contour of the support portion, and edging said sintered member along a predetermined edge portion of the sintered member to provide a cutting edge on the sintered member.

2. A method for producing a forming tool as set forth in claim 1 wherein said sintered web-like cutting edge defines at least one opening and the step of preparing said metal mount includes providing said sintered member support portion with at least one corresponding opening.

* * * * *